(12) United States Patent
Lakhani

(10) Patent No.: US 9,297,361 B2
(45) Date of Patent: Mar. 29, 2016

(54) COMPACT WIND AND WATER TURBINE

(71) Applicant: Mehboob Lakhani, Houston, TX (US)

(72) Inventor: Mehboob Lakhani, Houston, TX (US)

( * ) Notice: Subject to any disclaimer, the term of this patent is extended or adjusted under 35 U.S.C. 154(b) by 87 days.

(21) Appl. No.: 13/893,755

(22) Filed: May 14, 2013

(65) Prior Publication Data

US 2014/0159373 A1   Jun. 12, 2014

Related U.S. Application Data

(63) Continuation-in-part of application No. 12/714,460, filed on Feb. 27, 2010, now Pat. No. 8,536,725.

(51) Int. Cl.

| | |
|---|---|
| *F03B 13/00* | (2006.01) |
| *H02P 9/04* | (2006.01) |
| *F03D 9/00* | (2006.01) |
| *F03B 17/06* | (2006.01) |
| *F03D 3/00* | (2006.01) |
| *F03D 3/02* | (2006.01) |
| *F03D 3/06* | (2006.01) |
| *H02K 7/18* | (2006.01) |
| *H02K 47/20* | (2006.01) |
| *H02K 16/04* | (2006.01) |

(52) U.S. Cl.
CPC ............. *F03D 9/002* (2013.01); *F03B 17/063* (2013.01); *F03D 3/002* (2013.01); *F03D 3/02* (2013.01); *F03D 3/064* (2013.01); *H02K 7/1823* (2013.01); *H02K 16/04* (2013.01); *H02K 47/20* (2013.01); *F05B 2240/40* (2013.01); *F05B 2250/14* (2013.01); *F05B 2250/311* (2013.01); *Y02E 10/28* (2013.01); *Y02E 10/74* (2013.01)

(58) Field of Classification Search
CPC .......... F03B 17/063; F03B 13/00; F03D 3/02; F03D 9/002; F03D 3/002; F03D 3/064; F03D 3/0436; F05B 2250/14; F05B 2250/311; F05B 2240/40; Y02E 10/28; Y02E 10/74; H02K 7/1823; H02K 16/00; H02K 16/04; H02K 47/20; H02P 9/04
USPC .................................................. 290/54, 44, 55
See application file for complete search history.

(56) References Cited

U.S. PATENT DOCUMENTS

| | | | | |
|---|---|---|---|---|
| 3,634,873 | A | * | 1/1972 | Nishimura ............... 318/400.37 |
| 4,234,289 | A | * | 11/1980 | Lebost ........................... 415/4.4 |
| 5,838,085 | A | * | 11/1998 | Roesel et al. .................. 310/113 |

\* cited by examiner

*Primary Examiner* — Javaid Nasri

(57) ABSTRACT

A device for generating electrical power from fluid flow energy comprising a shaft member; at least one sleeve, wherein the shaft member passed through the at least one sleeve; a stationary stator, wherein the stationary stator coupled to the shaft member, and wherein the stationary stator comprising a first stator and a second stator, wherein the first stator is positioned adjacent to the second stator; and at least one moving stator, wherein the at least one moving stator positioned in concentric relation to the stationary stator.

20 Claims, 5 Drawing Sheets

COMPACT WIND AND WATER TURBINE

CROSS REFERENCE TO RELATED APPLICATIONS

This application is a Continuation-in-Part of the earlier U.S, continuation patent application Ser. No. 12/714,460 to Lakhani entitled "Compact Wind and Water Turbine System" which was filed on Feb. 27, 2010, now U.S. Patent No. 8,536, 725, the disclosures of which are hereby incorporated herein by reference.

BACKGROUND

Power generators including alternators and turbines are well known. Commonly, a power generator is designed to convert the energy from fluid flow into electric energy. The electric energy produced by the power generator corresponds to the intensity of fluid flow. Therefore, as the fluid flow changes, the power produced by the power generator varies. However, in order to generate optimum electricity, the power generator must operate at an optimum capacity.

Furthermore, existing power generators have also proven to be inadequate, failing to provide either adequate energy generation or sufficient stability against maximum velocity currents. Another significant problem is the environmental issues associated with obtaining energy from fluid flow without damaging surrounding environment.

Therefore it is desirable to have a power generator that readily operates at an optimum level, while it overcomes the problems currently existing in the art, and captures significantly larger share of energy from fluid flow.

BRIEF SUMMARY OF INVENTION

A device for generating electrical power from fluid flow energy comprising a shaft member; at least one sleeve, wherein the shaft member passed through the at least one sleeve; a stationary stator, wherein the stationary stator coupled to the shaft member, and wherein the stationary stator comprising a first stator and a second stator, wherein the first stator is positioned adjacent to the second stator; and at least one moving stator, wherein the at least one moving stator positioned in concentric relation to the stationary stator and coupled to the at least one sleeve.

A device for generating electrical power from fluid flow energy comprising a shaft member, at least one sleeve; wherein the shaft member passed through the at least one sleeve; a stationary stator, wherein the stationary stator coupled to the shaft member, and the stationary stator adjusting electric current level in the stationary stator; and at least one moving stator, wherein the at least one moving stator positioned in a concentric relation to the inner coil and coupled to at least one sleeve.

A device for generating electrical power from fluid flow energy comprising a frame, at least one power generator; a plurality of trapper housings, wherein the plurality of trapper housings coupled to the frame; wherein the at least one power generator is adapted to be driven by at least one trapper housing, and trapper housings are disposed in mechanical communication; and at least one transmission member moving the at least one trapper housing.

BRIEF DESCRIPTION OF THE DRAWINGS

Certain examples are described in the following detailed description and in reference to the drawings, in which.

DETAILED DESCRIPTION OF SPECIFIC EXAMPLES

Techniques described herein relate generally to systems and methods for generating electrical power from fluid flow.

Figure 1A:
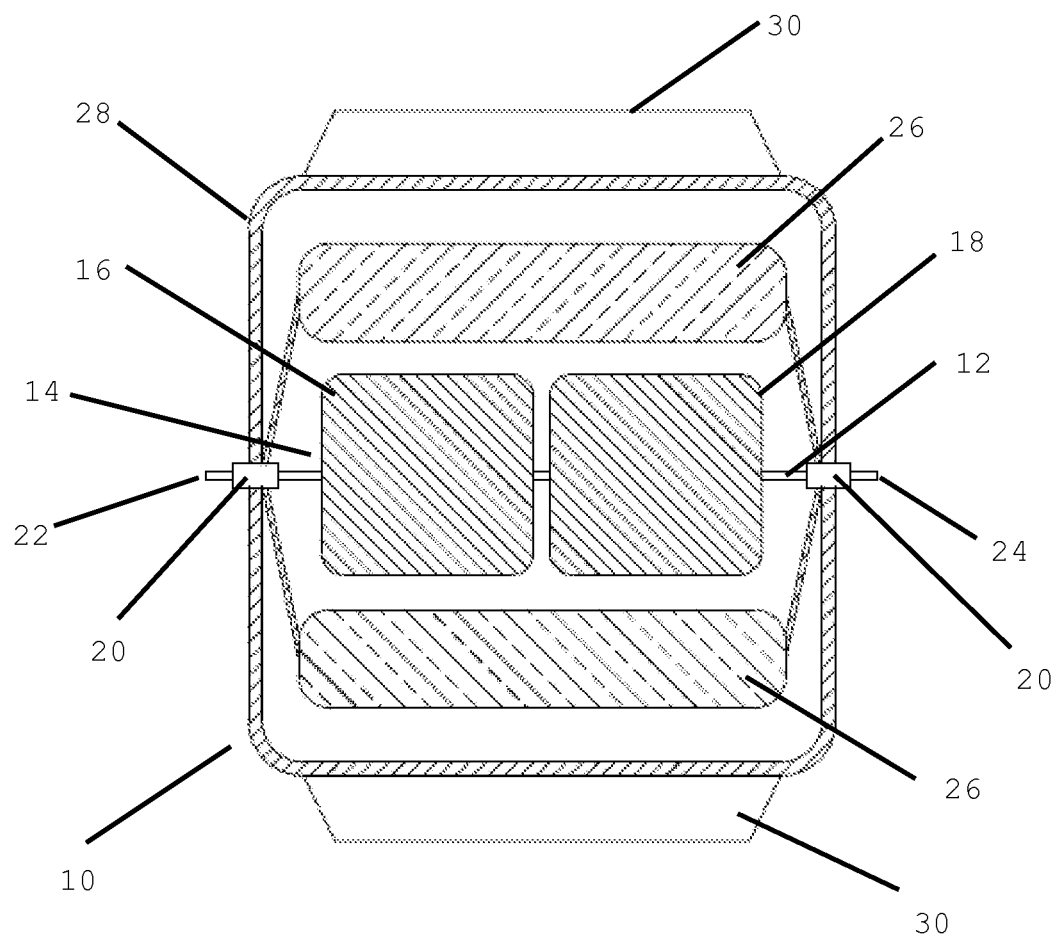
FIG. 1a is a cross sectional view of a power generator for generating electrical power from fluid flow energy.

FIG. 1a shows a cross sectional view of a Compact Wind and Water Turbine. Here, a Compact Wind and Water Turbine ("power generator") 10 may be used for generating electrical power from fluid flow energy. In present embodiment, the power generator 10 comprises of a shaft member 12. The shaft member 12 is an elongated shaft and it may be adapted to be placed at the center of the power generator 10. The shaft member 12 may be a hollow or a solid shaft member.

The shaft member 12 may be one of stationary or a moving shaft member. The shaft member 12 may be a metallic, dielectric, or a plastic shaft. In one embodiment, the shaft member 12 may be a continuous shaft member, while in one embodiment the shaft member 12 may comprise of a plurality of shafts positioned adjacent to one another.

A stationary stator 14 is positioned on the shaft member 12. The stationary stator 14 may be a magnet, wire winding, stator, or a combination thereof. Here, the stationary stator 14 may be a dual stator, wherein the stationary stator 14 is divided into a first stator 16 and a second stator 18. In present embodiment, both first and second stators, 16 and 18, may be affixed to the shaft member 12. Both first and second stators, 14 and 16, may centrally receive the shaft member 12 therein. Although both first and second stators coils share the shaft member 12, they may remain apart from one another. This arrangement allows one of the first stator 14 to be a consuming stator and the second stator 16 to be a generating stator. The first stator 16 may be connected to a power source. The second stator 18 may only generate power.

Furthermore, the first stator 16 may comprise of a circuit, programmable chip, microprocessor, controller, and relay. The first stator 16 may regulate the flow of electric current into the first stator 16. In a non-limiting example, the first stator 16 may operate to be energized to a required level. Once the electric current in the first stator is reached a required level, the first stator 16 ceases to be energized.

Further, the first stator 16 may be re-energized when it's required. The second stator 18, to be a generating stator.

Moreover, in present embodiment, sleeve members 20 may be positioned near opposing ends 22, 24 of the shaft member 12. The sleeve members 20 may be disposed in a concentric arrangement with the shaft member 12. Further, the sleeve members are adapted to receive the opposing ends 22, 24 of the shaft member 12 therein. The sleeve members 20 may be hollow sleeve members where they operate as rotors. The sleeve members 20 may rotate about the shaft member 12 in a spinning motion.

At least one moving stator 26 may be positioned adjacent to the stationary stator 14. The moving stator 26 may be a magnet, wire winding, stator, or a combination thereof. The at least one moving stator 26 may be coupled to at least one of the sleeve members 20. The at least one moving stator may be coupled to the housing 28. In one embodiment, the at least one moving stator 26 may be integral to the sleeve members 20. This arrangement allows the at least one moving stator 26 to rotate in a spinning motion around the stationary stator 14. The at least one moving stator 26 may be one of coil winding, magnet, or a combination thereof.

A housing 28 may be configured to contain the stationary stator 14, the at least one moving stator 26, and the shaft member 12 for the majority. In some instances, the housing 28 may be a plastic, metallic, or fiberglass housing. The housing 28 may be rotatably coupled with one of the sleeves 20. The housing 28 may be coupled to the at least one moving stator 26.

In one embodiment, the sleeve members 20 may be integral part of the housing 28. In present embodiment, the housing 28 comprises of trapper members 30 on its periphery. The trapper members 30 may be positioned equally spaced from another on the housing 28 (shown in FIG. 1b). The trapper members 30 may be one of trappers, vines, paddles, blades, and the like. The trapper members 30 are configured to capture fluid flow and move the housing 28 in the spinning movement about the shaft member 12.

In one embodiment, having the at least one moving stator 26 coupled with the interior of the trapper housing 28 allows the at least one moving stator 26 to rotate around the stationary stator 14.

In an operational example, fluid flow engages the trapper members 30 and set the trapper housing 28 in rotating motion about the shaft member 12. Subsequently, the trapper housing's rotation sets the at least one moving stator 26 in rotation around the stationary stator 14. Thereby generating electricity in the stationary stator 14 when the electromagnetic field created by the at least one moving stator 26 constantly interrupted by the present of the stationary stator 14.

In this embodiment, however, in absence of sufficient fluid flow, the housing's rotation may not reach a required rotation per minute ("RPM"). The required RPM may be necessary for optimum power generation from the power generator 10. In this instance, the first stator may open flow of electric current into the first stator 16 from an electric power source. When the first stator 16 is energized, it may create an electric motor like effect to rotate the at least one moving stator 26 and the housing 28.

Once the housing 28 reached a required RPM, the first stator may shut off the flow of electric current into the first stator 16. The required RPM may vary; however, in this case a range between 1 to 7000 RPM is contemplated. At the required RPM, the second stator 18 produces optimum electrical power. In present embodiment, the optimum electrical power may be reached when the velocity of fluid flow increases to a level capable of generating a required RPM for the housing. Thereafter, the first stator may shut off the self-charging mechanism.

Figure 1B:
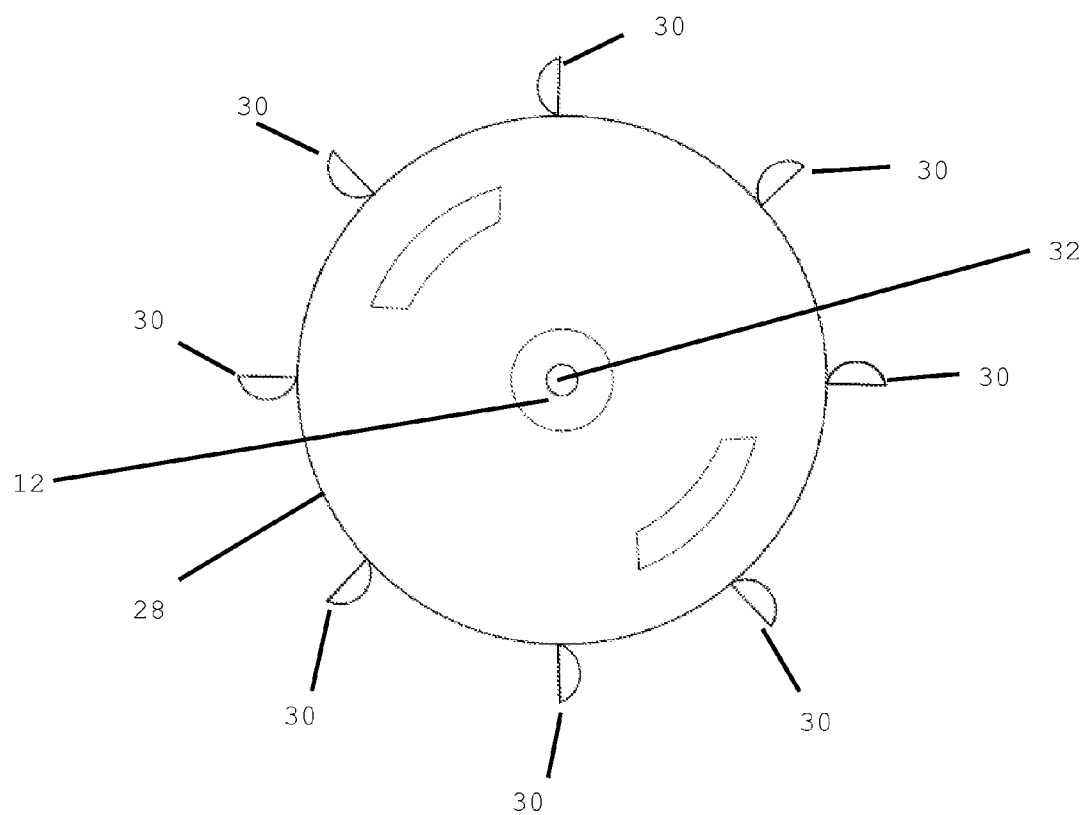
FIG. 1b is a side view of the power generator for generating electrical power from fluid flow energy.

FIG. 1b shows a side view of the trapper housing 28. The housing 28 may be a hollows body. The housing 28 may be a cylinder, a cube, and the like. Also, the housing 28 may be configured to have at least one sensor-receiving aperture 32. The sensor-receiving aperture may be positioned within the shaft member. The receiving apertures 32 may receive a variety of sensors including but not limited to measurement sensor, maintenance sensor, magnetic flux sensor, and the likes. In one embodiment. Here, at least one sensor-receiving aperture may be positioned within the shaft member 12, inside the housing 28. Furthermore, the trapper members 30 may be a plurality of scoop like trappers to capture more energy from fluid flow.

Figure 2:
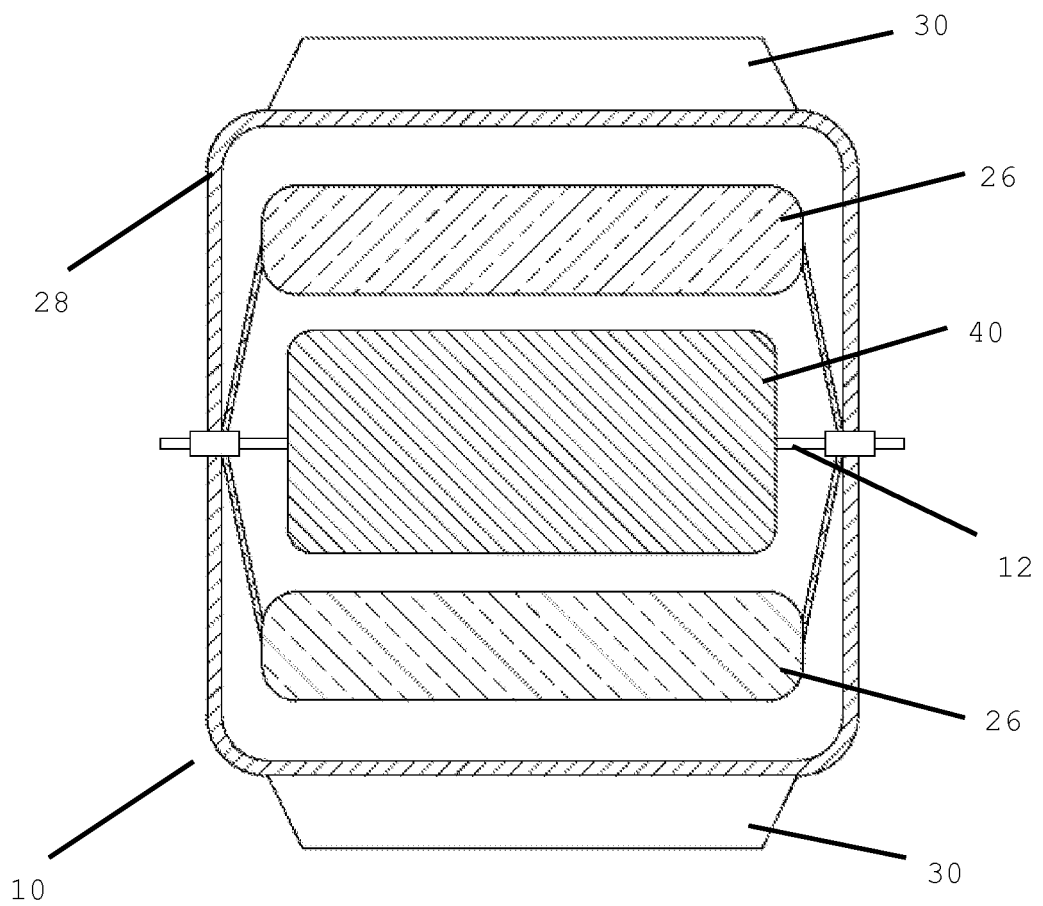
FIG. 2 is a cross sectional view of a power generator for generating electrical power from fluid flow energy.

FIG. 2 shows a cross sectional view of an embodiment of the power generator 10. In present embodiment, the stationary stator 40 is a single stationary stator. The stationary stator 40 positioned adjacent the shaft member 12, wherein the stationary stator 40 receives the shaft member 12 therein. In present embodiment, the stationary stator 40 may be affixed to the shaft member 12.

The stationary stator 40 may be configured to swap between a motor and a generator mode. In the motor mode, the stationary stator 40 consumes power, while in the generator mode the stationary stator 40 generates power. In the motor mode, the stationary stator 40 may be energized by an electric source. While the stationary stator 40 is being energized, the power generator 10 may act as an electric motor to set in the at least one moving stator 26 and the housing 28 into a rotating motion. Conversely, during the generating mode, the stationary stator 40 may no longer be energized by an electric source; rather the stationary stator 40 may be energized as the at least one moving stator 26 rotate around the stationary stator 40, and hence generating electrical power.

As discussed in connection with the embodiment of FIG. 1a and FIG. 2, here too, the stationary stator 40 may comprise of a circuit, programmable chip, microprocessor, controller, and relay. The stationary stator 40 may self-regulate the flow of electrical current in and out of the stationary stator 40.

In this embodiment, once the housing reached a required RPM, the stationary stator 40 may shut off the flow of electric current into the stationary stator 40. The required RPM may vary; however, here a range between 1 to 7000 RPM is contemplated. For example, if the required RPM is set at 4000, the stationary stator 40 may no longer be charged when the housing 28 rotates faster than 4000 RPM. Furthermore, if the intensity of fluid flow remains high enough to cause the housing to rotate higher than 4000 RPM, the stationary stator 40 may switch to the generating mode and only generate electric power.

Figure 3:
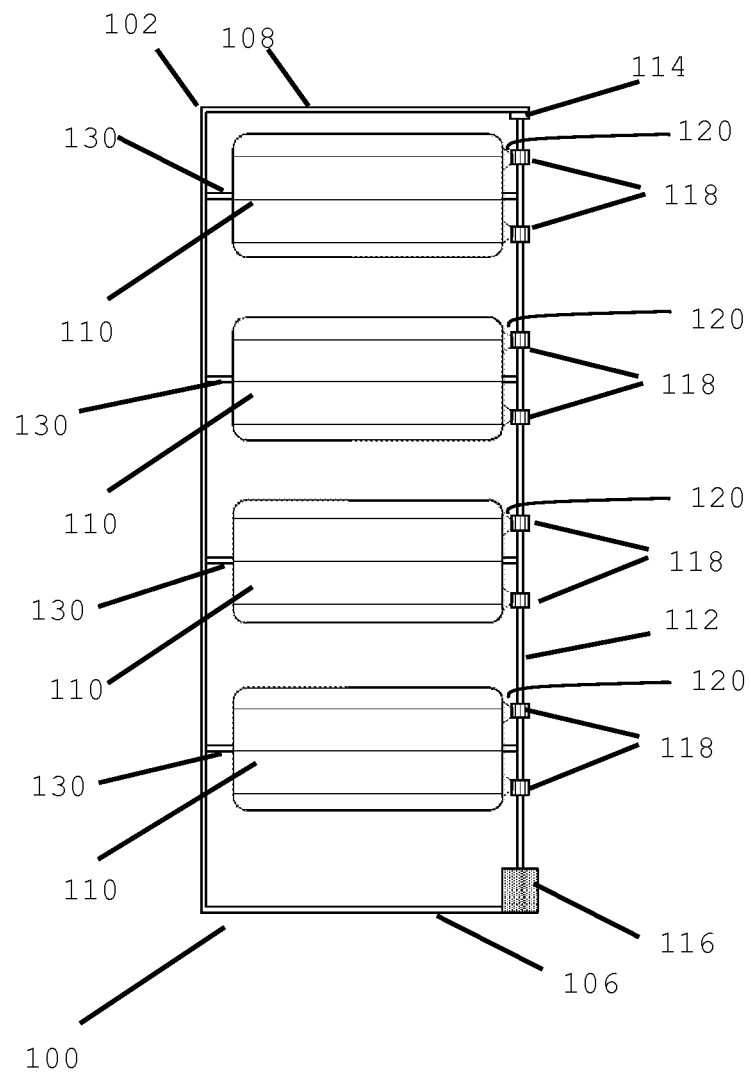
FIG. 3 is a top view of a power generator for generating electrical power from fluid flow energy having a plurality of arranged power generators.

FIG. 3 is a top view of a power generator 100. The power generator 100 may comprise of a frame member 102 and a plurality of power generator units 110 coupled thereto. The power generator units 110 may be Compact Wind and Water Turbines discussed in connection with FIG. 1a and FIG. 2, or other similarly operating power generators.

Moreover, the sides 104, 106, 108, 112 may form the frame member 102. In one embodiment, the frame member 102 may be configured in a closed frame, while in some embodiment; the frame member 102 may be an open-ended frame. The frame member 102 may be wooden, metallic, plastic frame or it may be constructed from a combination of the aforementioned materials.

Further, the frame member 102 may comprise of attachment members 130 coupled to two sides, 104, 112. The attachment members 130 may rotatably secure the generator units 110 within the frame members 102. In addition, the attachment members 130 may align the power generator units 110 to receive fluid flow energy. The frame member 102 may provide support to the power generator units 110, wherein the frame member 102 securely maintains the power generator units 110 in a suspended arrangement. The frame member 102 may include a plurality of rest members (not shown). The rest members may maintain the frame member 102 above a surface area.

Besides, at least one side member 112 may be adapted to engage at least two power generator units in mechanical communication with each other. Here, the side member 112 may comprise a power transmission unit 116, a communication shaft 132, and at least one socket member 114. The at least one socket member 114 may be coupled to the side 108 of the frame 102. The at least one socket member 114 receives one end of the communication shaft 132 therein. The communication shaft 132 may comprise of a plurality of engagement members 118. The engagement members 118 are adapted to be placed in mechanical communication with the power generator units 110. The power generator units 110 may comprise of receiving members 120, wherein the engagement members 118 engage the receiving members 120. Furthermore, the communication shaft 112 members may be coupled to the transmission unit 116. The transmission unit 116 may be an electric or hydraulic motor.

Also, the power transmission unit 116 may be positioned in communication with the communication shaft 132, where in the transmission unit 116 spins the communication shaft along its horizontal axis. In an operational example, once the transmission unit 116 activates, it sets the communication shaft 132 in spinning motion. Thereafter, the communication shaft 132 spins the engagement members 118, whereby the engagement member rotate the receiving members 120, which results in the generator units 110 spinning corresponding to the spinning movement of the receiving members 120. Here, the transmission member may continue to operate until the power generating units 110 rotate at a predetermined RPM. The predetermined RPM may be ideal for generating electricity.

Besides, instead of power generator units, a combination of conventional power generators and hollow trapper housings may be placed within the frame member. The conventional power generators may be adapted to be driven by the hollow trapper housings. In this arrangement, the hollow trapper housings may be in mechanical communication with each other, wherein each trapper housing rotates in the same manner as the adjacent hollow trapper housing.

In one embodiment, the power generators shown in the FIG. 3 may be hollow trapper housings. The hollow trapper housing may be placed in mechanical communication using gears, belt and pulley, chain and cog, communication shaft, bearings, and the likes. Those trapper housings may rotate once receiving fluid flow energy, thereby rotating the communication shaft. Thereafter, the communication shaft may rotate the transmission member, wherein the transmission member is a power generator.

Figure 4:
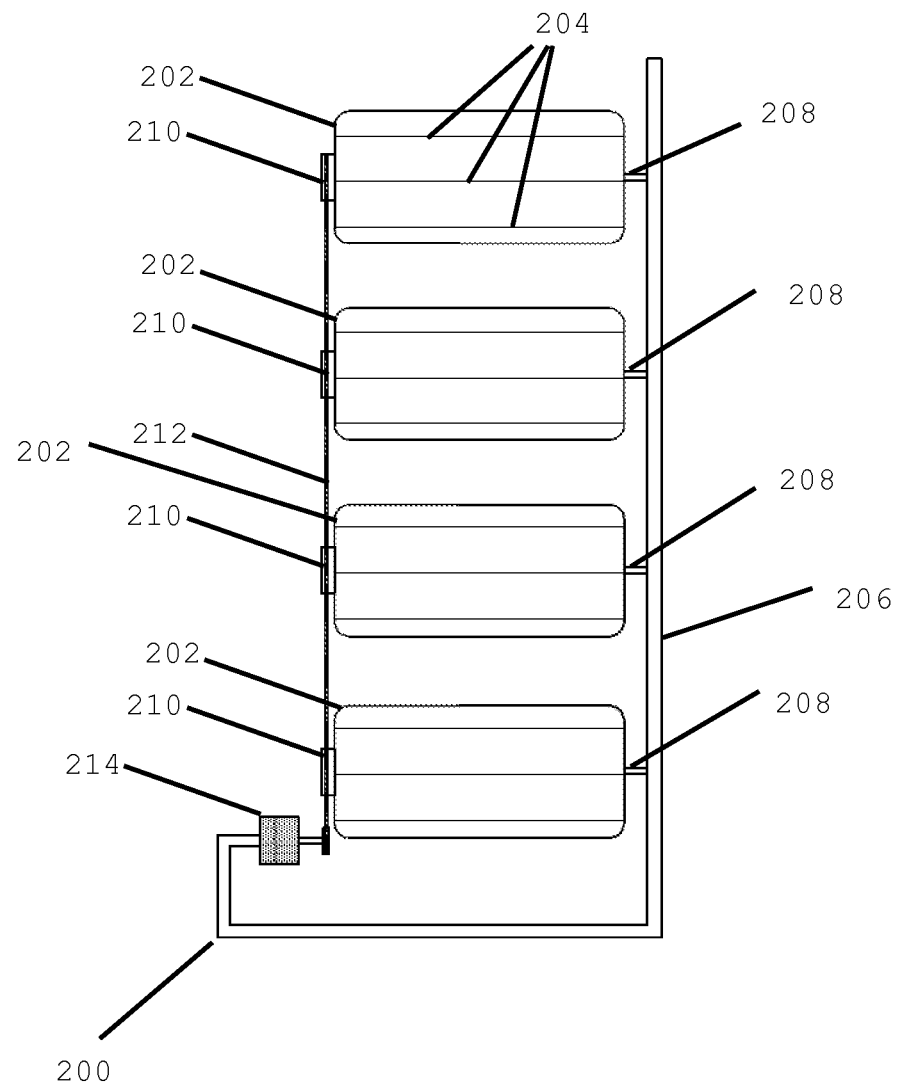
FIG. 4 is top view of an embodiment of the power generator for generating electrical power from fluid flow energy having a plurality of trapper housings.

FIG. 4 shows a top view of an embodiment of a power generator 200. The power generator 200 having a plurality of arranged power trapper housing 202. The trapper housing may be a hollow or solid trapper housing. Each trapper housing 202 further comprising a plurality of trappers 204 positioned equally spaced from each other on the periphery of the trapper housing 202. The trappers 204 are configured to engage the fluid flow and capture its energy. Attachment members 208 may movably couple each trapper housing 202 to the frame member 206. The attachment member 208 may be a shaft. Here, the attachment members 208 may extend at least partially into the trapper housing 202.

Besides, the trapper housings 202 may be disposed in mechanical communication with another. In this embodiment, each trapper housing 202 may comprise of an engagement member 210. The engagement member 210 may be a pulley, gear, and the likes. The engagement members 210 may be mechanically engaged by an engaging means 212. The engaging means 212 may be a belt, cog, chain, gear, and the likes.

Furthermore, the engaging means 212 may be adapted to put the trapper housings 202 in mechanical communication with at least one power generator 214. The at least one power generator 214 may be adapted to be driven by at least one trapper housing 202. In this embodiment, the trapper housings 202 rotate once receiving fluid flow energy. Hence, setting the power generator 214 in motion.

In one embodiment at least one trapper housing may be coupled to at least one generator. Further, the at least one trapper housing comprising a first engagement member and at least one power generator comprising a second engagement member. The first and second engagement members may be one of bearings, gears, chains, belts, cogs, or a combination thereof. The first engagement member may be larger than the second engagement member. Furthermore, the first and second engagement members are mechanically engaged. Therefore, a lower RPM in the first engagement member may cause a higher RPM in the second engagement member. This arrangement may cause the generator to rotate faster compared to the trapper housing.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the invention.

What is claimed is:

1. A device for generating electrical power from fluid flow energy comprising:
   a shaft member;
   at least one sleeve,
      wherein the shaft member passed through the at least one sleeve,
      wherein the at least one sleeve operates as a rotor;
   a stationary stator, wherein the stationary stator coupled to the shaft member, and
      wherein the stationary stator comprising a first stator and a second stator,
      wherein the first stator is positioned adjacent to the second stator; and
   at least one moving stator, wherein the at least one moving stator positioned in concentric relation to the stationary stator.

2. The device as in claim 1, further comprising a housing configured to surround the at least one moving stator and the stationary stator therein, wherein the housing coupled to the at least one sleeve, and the housing further comprises at least one trapper member positioned on periphery of the housing.

3. The device as in claim 2, further comprising the at least one moving stator coupled to interior of the housing, wherein the housing rotates the at least one moving stator.

4. The device as in claim 2, wherein the at least one trapper member is a member selected from a group consisting of paddles, blades, and vanes.

5. The device as in claim 1, wherein the at least one moving stator is a stator selected from a group consisting of magnet, coil winding, and coil winding-magnet.

6. The device as in claim 1, further comprising at least one sensor-receiving aperture coupled to the shaft member, wherein the at least one sensor-receiving aperture receives at least one sensor therein.

7. The device as in claim 1, further comprising the first stator swapping between a motor mode and a generating mode.

8. The device as in claim 7, wherein the first stator in the motor mode moves the at least one moving stator, and the first stator in the generator mode generates power as the at least one moving stator moves.

9. The device as in claim 1, wherein the second stator is a generating stator.

10. A device for generating electrical power from fluid flow energy comprising:
   a shaft member,
   at least one sleeve,
      wherein the shaft member passed through the at least one sleeve,
      wherein the at least one sleeve operates as a rotor;
   a stationary stator, wherein the stationary stator coupled to the shaft member, and said stationary stator swapping between a motor mode and a generator mode; and
   at least one moving stator, wherein the at least one moving stator positioned in a concentric relation to the stationary stator.

11. The device as in claim 10, further comprising a housing configured to surround the at least one moving stator and the stationary stator within the housing, wherein the housing coupled to the at least one sleeve, and the housing further comprising at least one trapper positioned on periphery of the housing.

12. The device as in claim 10, wherein the at least one moving stator is a stator selected from a group consisting of magnet, coil winding, and coil winding-magnet.

13. The device as in claim 11, further comprising the at least one moving stator coupled to interior of the housing, and at least one sensor-receiving aperture coupled to the shaft member.

14. The device as in claim 10, wherein the stationary stator in the motor mode moves the at least one moving stator, and the stationary stator in the generator mode generates power as the at least one moving stator moves.

15. A device for generating electrical power from fluid flow energy comprising:
   a frame,
   at least one generator;
   a plurality of trapper housings, wherein the plurality of trapper housings coupled to the frame;
   wherein the at least one generator is adapted to be driven by at least one trapper housing, and at least two trapper housings are disposed in mechanical communication and rotating in the identical manner.

16. The device as in claim 15, wherein adjacent trapper housings connecting mechanically.

17. The device as in claim 15, wherein the at least one trapper housing having trapper members selected from a group consisting of trappers, paddles, vines, and blades.

18. The device as in claim 15, wherein at least one transmission member moving at least one trapper housing.

19. The device as in claim 15, wherein the at least one trapper housing comprising a first engagement member and at least one power generator comprising a second engagement member, wherein the first and second engagement member are in mechanical communication.

20. The device as in claim 15, further comprising the at least two trapper housings mechanically communicating by a communication means, wherein the communication means selected from the group consisting belt and pulley, gears, shaft, and chains and gears.

* * * * *